(12) United States Patent
Kanaris

(10) Patent No.: US 6,766,900 B2
(45) Date of Patent: Jul. 27, 2004

(54) RELEASABLE BACKSTOP FOR CONVEYOR ROLLERS

(75) Inventor: Alexander D. Kanaris, Toronto (CA)

(73) Assignee: Van der Graaf Inc., Ontario (CA)

( * ) Notice: Subject to any disclaimer, the term of this patent is extended or adjusted under 35 U.S.C. 154(b) by 53 days.

(21) Appl. No.: 10/276,393

(22) PCT Filed: Jun. 6, 2001

(86) PCT No.: PCT/CA01/00834
§ 371 (c)(1),
(2), (4) Date: Nov. 15, 2002

(87) PCT Pub. No.: WO01/94244
PCT Pub. Date: Dec. 13, 2001

(65) Prior Publication Data
US 2004/0020750 A1 Feb. 5, 2004

(30) Foreign Application Priority Data
Jun. 7, 2000 (CA) ............................................. 2310820

(51) Int. Cl.$^7$ ............................................. B65G 23/04
(52) U.S. Cl. ...................................... 198/835; 198/788
(58) Field of Search ................................. 198/788, 835

(56) References Cited

U.S. PATENT DOCUMENTS

| 2,686,430 | A | * | 8/1954 | Laurence | 198/835 |
| 3,268,066 | A | * | 8/1966 | Kishimoto | 198/835 |
| 4,548,316 | A | | 10/1985 | Maurer | |
| 6,612,422 | B2 | * | 9/2003 | Roberts et al. | 198/788 |

FOREIGN PATENT DOCUMENTS

| EP | 0 327 975 | 8/1989 |
| EP | 0 457 475 | 11/1991 |

* cited by examiner

Primary Examiner—Joseph Valenza
(74) Attorney, Agent, or Firm—Ohlandt, Greeley, Ruggiero & Perle

(57) ABSTRACT

An internally powered conveyor roller, of the type used for driving a conveyor one direction, and for preventing movement in opposite direction and having a drive roller for driving the conveyor medium, an internal drive motor for driving the roller, a one-way rotation device permitting rotation of the roller in one direction, and for preventing rotation in the opposite direction, and the one way rotation means being moveable between engaged and disengaged positions, and when in the disengaged position, being inoperative to prevent reverse rotation of the roller.

10 Claims, 4 Drawing Sheets

RELEASABLE BACKSTOP FOR CONVEYOR ROLLERS

TECHNICAL FIELD

The invention relates to rollers for conveyor systems, and in particular to an internal drive conveyor roller system having a backstop, or anti-reverse movement check, and in which the backstop can be released in certain circumstances to allow reverse movement of the conveyor system.

BACKGROUND ART

Many conveyors are designed around a systems of conveyor chains or mesh screens, or in some cases, conveyor belts. These conveyor "media" may be supported on simple shafts on which may be mounted various forms of sprockets, or drive means for supporting the conveyor media. More advanced conveyor systems are known using enclosed and sealed drive rollers with the drive motors contained inside the rollers themselves.

The use of internal drives for the conveyor rollers is particularly advantageous in many situations where conveyors are required. In these systems the rollers usually carry a conveyor belt or conveyor chains or some similar supports, which run over the rollers and which carry load items or product to be conveyed.

Food product conveyors are a typical example where such internal drive rollers are used, although the invention is not restricted to such use.

The roller drives are located inside the drive rollers themselves, and are sealed, and are not liable to contamination from the product being carried, and furthermore the product itself will not be contaminated by the drive system, which may require lubricants, and which may accumulate dirt, if exposed.

In many situations, parts of the conveyor system will run level, but at other locations the conveyor system runs at an angle. In these locations the conveyor belts or chains are required to run along an uphill incline. In these cases if the incline conveyor is halted for any reason, the weight of product will tend to cause the incline conveyor to run in reverse. If this is allowed to occur, the product will move backwards and will accumulate at the bottom of the incline conveyor, and probably collect at the leading end of the preceding level portion of the conveyor system.

This will in most cases damage the load items or product and will cause downtime on the system while the problem is corrected. In order to prevent this from happening it is known to provide the incline conveyor, in one of the rollers, with what is known as a "backstop". This is simply a form of dog clutch or brake, which allows rotation in the forward direction, ie with the conveyor running up the incline, but prevents rotation in the reverse direction. By the use of this backstop device reverse movement of the incline conveyor cannot take place. If the conveyor system stops for any reason, the incline conveyor will simply remain stationary, without moving or slipping backwards.

While this device solves the problem of unwanted reverse movement, there are some cases where the operator of the conveyor system will want to override the backstop. The operator for whatever reason wishes to permit the conveyor to move in reverse. However the effect of the backstop is to prevent this altogether.

Clearly therefor in order to satisfy customer requirements it is desirable to provide a backstop which is normally engaged, and which thus prevents reverse movement, but which can be disengaged by the operator, in situations where he wishes the conveyor to move in reverse.

DISCLOSURE OF THE INVENTION

With a view to satisfying the foregoing requirements the invention s provides an internally-powered conveyor roller, of the type used for driving a conveyor medium in a first predetermined direction, and for preventing movement in a second direction opposite to the first and having roller means for carrying the conveyor medium, internal drive means for driving the roller means, one-way rotation means for permitting rotation of said roller means in one direction, and for preventing rotation in the opposite direction, and, said one way rotation means being moveable between engaged and disengaged positions, and when in said disengaged position, being inoperative to prevent reverse rotation of said roller means.

The invention further provides an internally powered conveyor roller having the foregoing advantages and wherein said roller means includes a cylindrical drum, and end discs closing each end of the drum, and motor means located within said drum.

The invention further provides an internally powered conveyor roller having the foregoing advantages and wherein said end discs incorporate hubs and mounting shafts extending through said hubs for mounting said roller means in position in a conveyor system.

The invention further provides an internally powered conveyor roller having the foregoing advantages and wherein said motor means drives said drum through reduction gear means within said drum.

The invention further provides an internally powered conveyor roller having the foregoing advantages and wherein said one-way rotation means includes a body member engageable with said motor drive means for controlling one way rotation thereof, and means for moving said body member into a disengaged position wherein said motor is free to rotate in either direction.

The invention further provides an internally powered conveyor roller having the foregoing advantages and wherein said body member is enclosed within a ring member and including rod means connected to said ring member and extending therefrom axially of said drum and through said disc member at one end of said drum, and means for operating said rod member to draw the same outwardly or to return it inwardly, thereby diseasing said body member from said motor shaft upon outward movement and re-engaging said body member with said motor shaft upon return movement of said rod member.

The invention further provides an internally powered conveyor roller having the foregoing advantages and wherein said body member is formed with spaced apart roll recesses and rolls moveably located in respective recesses, and said rolls moving inwardly within said recesses upon rotation in one direction, and said rolls moving outwardly of said recesses upon reverse movement, thereby contacting and binding against said ring member and preventing further such reverse movement.

The invention further provides an internally powered conveyor roller having the foregoing advantages and wherein said motor shaft is formed with a splined end portion and wherein said body member is formed with an internally splined recess for receiving said splined end, when in said engaged position.

The invention further provides an internally powered conveyor roller having the foregoing advantages and wherein a support shaft is secured to said disc member closing said drum at one end thereof, and said shaft member defining a hollow interior and wherein said rod member is located within said hollow shaft member.

The invention further provides an internally powered conveyor roller having the foregoing advantages and wherein said rod member is provided with means for grasping the outwardly extending portion of said rod member and manually drawing said rod member outwardly as aforesaid.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

MODES OF CARRYING OUT THE INVENTION

As explained above the invention finds its application as part of a conveyor system. Such conveyors may be found in many different applications. One significant aspect of such conveyor systems is that they are designed around conveyor rollers which carry the conveyor medium. This may be a belt, or a series of conveyor supports such as chains. The drive rollers in such a conveyor system which are powered so as to drive the conveyor medium are internally driven. That is to say the drive rollers contain within the roller drum, the drive motor and in most cases, reduction gears. The entire drum is sealed so that all lubricants are retained within the interior of the drum, and all outside contaminants are excluded. The only connection to the exterior is provided by support shafts extending from each end of the roller, and electrical connections by which power is supplied to the drive motor within the drum.

Clearly not all rollers in such a system are power driven. Some are idle rollers which function simply to support the conveyor medium. However in this case also the rollers are sealed so that there is no contamination.

Where the conveyor system is required to elevate the load items, referred to herein as "product", then a length of the conveyor is provided which runs at an angle, on an incline. Conveyor segments at each end of the incline will usually be level.

As explained in such incline sections the powered roller is provided with a backstop, or anti-rollback device. This functions to prevent reverse movement of the inclined conveyor, if the conveyor is stopped for any reason.

The invention is directed to the provision of such a backstop device which can be manually disengaged, or re-engaged as required by the operator.

Figure 1:
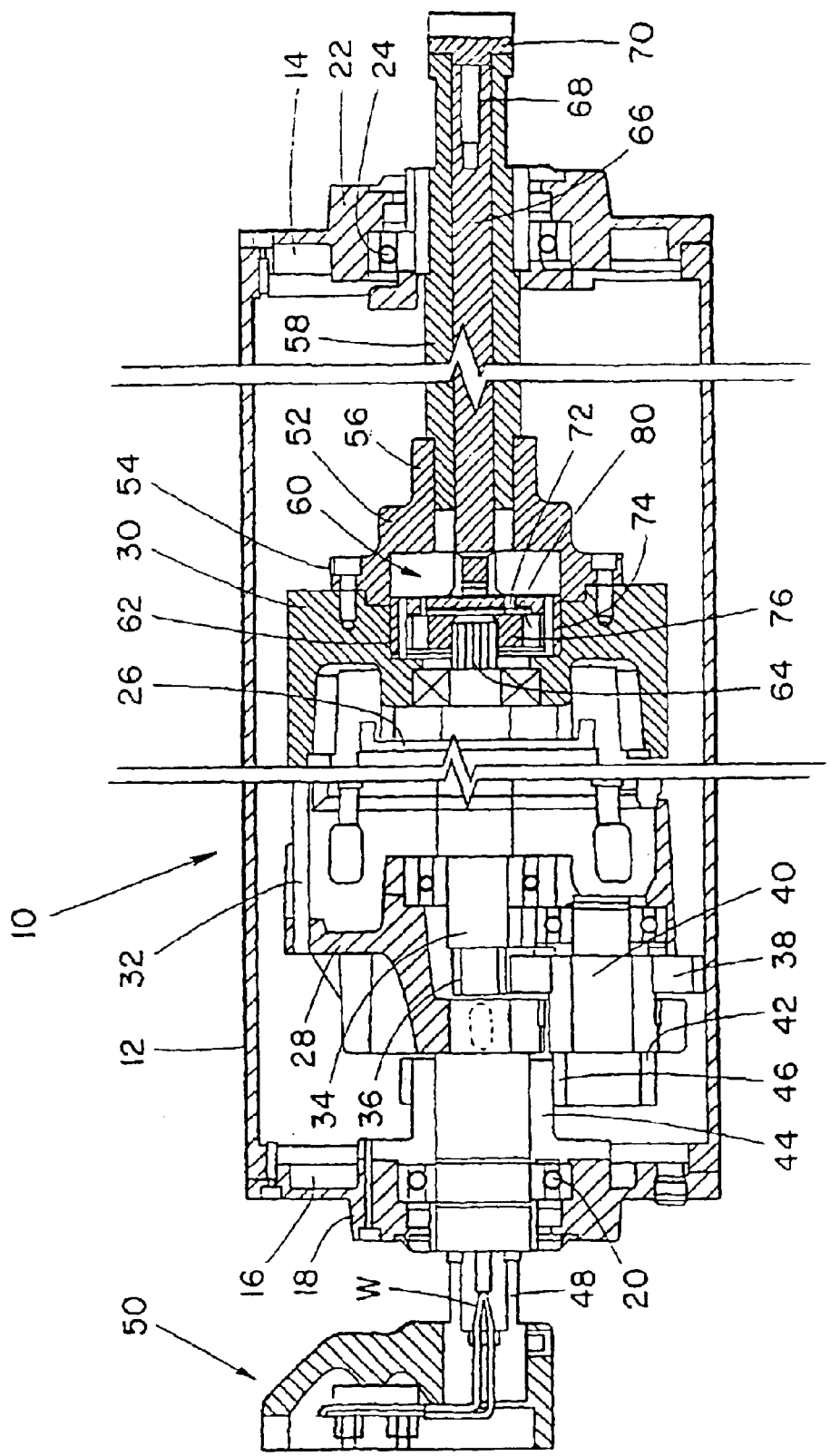
FIG. 1 is a schematic sectional side elevation, partially cut away and shortened, of a conveyor roller, with an internal drive, and illustrating one embodiment of the invention in the form of a releasable backstop.

Referring to FIG. 1 the invention is illustrated in the form of a powered roller 10. It is understood that such roller 10 is to be located somewhere in a conveyor system where the conveyor medium is inclined. Roller 10 would thus normally be supported on a framework (not shown) of a type well known in the art and requiring no description. A conveyor medium such as a belt or chains or the like (not shown) would run around roller 10 in a manner well known in the art.

Idle rollers (not shown) would also be provided so that the conveyor medium runs around a continuous path in a manner well known, and is supported in a manner adequate for the product being carried. Usually the driven roller will be at one end of the conveyor segment, either the lower or upper end.

The roller 10 is provided with a cylindrical hollow drum 12, which is supported at each end by respective left and right end discs 14 and 16. Left disc 14 has a central hub 18 supporting a bearing 20 and right disc 14 has a hub 22 supporting a bearing 24.

An electrical drive motor is indicated generally as 26. It is mounted within the interior of drum 12 and is supported between a left end housing 28 and a right end housing 30. The drive housings and motor are known per se and are held together as a unit by threaded rods 32. A drive shaft 34 extends through motor 30 and through both left and right housings 28 and 30.

The left end of shaft 34 is formed with shaft gear teeth 36. A reduction gear 38 is mounted in left end housing 28 and is driven by shaft teeth 36.

Gear 38 has a gear shaft 40, formed with reduction teeth 42. Teeth 42 engage a drum drive gear 44, formed on left hub 18 of the left end disc 16. Drum gear has external teeth 46. The location and number of teeth 46 can vary from one application to another. While the teeth 46 are shown on an inner portion of hub 18, which is in effect in the position of a sun gear in an epicyclic system, it will be appreciated that hub 18 can be formed with a much larger gear ring (not shown) having internal teeth, which would be in effect in the position of the ring gear of an epicyclic system. Such a ring gear would have many more teeth, than the central sun-type gear shown, and so a greater speed reduction would be obtained.

A left roller mounting shaft 48 is received in the left hub 18, thus permitting the left end of the roller to be mounted and secured on a suitable frame or support, at a desired location in the conveyor system. Electrical connection box 50 is fastened adjacent the left end of roller 10, and wires W extend through the left end mounting shaft (not shown) for supplying power to the motor.

Attached to the right motor housing 30 is the backstop housing 52. Housing 52 defines an annular flange 54 by which it is bolted to right motor housing 30. Extending from flange 54 is shaft connector sleeve 56. A right mounting shaft 58 is secured in sleeve 56 and extends axially through drum 12 and out through right disc hub 22. Bearings 24 in disc hub 22 ride on shaft 58 permitting rotation of drum 12 relative to shaft 58. Suitable seals are provided to prevent exiting or entry of contaminants. Shaft 58 may be secured at the right end of the roller 10 to a frame or support, in a suitable location in the conveyor system.

Within backstop housing 52 a hollow interior chamber 60 is defined. Right motor housing 30 also defines a recess 62 of similar diameter to chamber 60.

Motor shaft 34 extends into the interior of recess 62 and is formed with splines 64 on its free end.

A control rod 66 extends through the hollow interior of right mounting shaft 58. At its right end rod 66 it extends out of shaft 58 and is provided with threaded bore 68. A plug 70 is received in bore 68 of rod 66.

At the inboard or left end of control rod 66 there is a backstop end plate secured to rod 66. A cylindrical ring 74 extends from plate 72 is normally received in the recess of 62 of right motor housing 30.

Dowel pins 75 are located within motor housing 30 around chamber 62. Ring 74 has recesses registering with the dowel pins and is thus locked against rotation relative to housing 30. However ring 74 is slideable along pins 75 out of between recess 60 and 62 for reasons to be described below. Within ring 74 a one way backstop bearing body 76 is located. Body 76 is generally annular and carries within it a drive body 77 having a central splined recess 78. Recess 78 normally receives splined end 64 of motor shaft 34. Both body 76, and drive body 77 with its central splined recess 78 are retained together with a key (known per se) to prevent relative rotation and retained by retaining circlip C to secure it in its axial location. When the shaft end is received in the recess 78 in body 76, shaft 34 and body 76 are locked together.

Body 76 supports a plurality of backstop rolls 80 in respective angled recesses 82. A ring 81 surrounds body 76 and rolls 80. Within their respective recesses 82 rolls 80 are movable outwardly and inwardly relativ to body 76. In their outer position the rolls 80 engage the inner surface of ring 81, and wedge securely against it preventing movement of body 76 relative to ring 81.

Ring 81 is itself secured within ring 74, by a press fit.

Body 76 is retained in ring 74 by a retention circlip 84, leaving body 76 free to rotate in one direction, within ring 74, as described, without restriction from the circlip 84.

Ring 74 as explained above, is locked within chamber 62 of housing 30 by dowel pins 75. When in their inward positions the rolls 80 roll freely, out of wedging contact within ring 81, and permit rotation of body 76 relative to ring 81. In this way when motor 26 is driving its motor shaft 34 normally, body 76, which is locked to shaft 34 by spline end 64 in recess 78 is free to rotate within ring 81, in the driving direction. Dowel pins 75 will prevent backstop ring 74 and plate 72 from rotational movement and thus the entire backstop assembly holds the motor shaft 34 against reverse rotation, while allowing forward rotation.

However, as stated above the dowel pins 75 allow ring 74 to move axially into recesses 62 and back into chamber 60.

Under normal operation, in the event of a shut down of motor 26 for any reason, any attempt by drum 18 to rotate in reverse is prevented. This because body 76 remains locked to shaft 34, and is wedged against reverse rotation by the wedging engagement between rolls 80 and ring 81.

Body 76 and the splined recess 78 are normally engaged with the splined recess end of 64 motor shaft 34.

Figure 2:
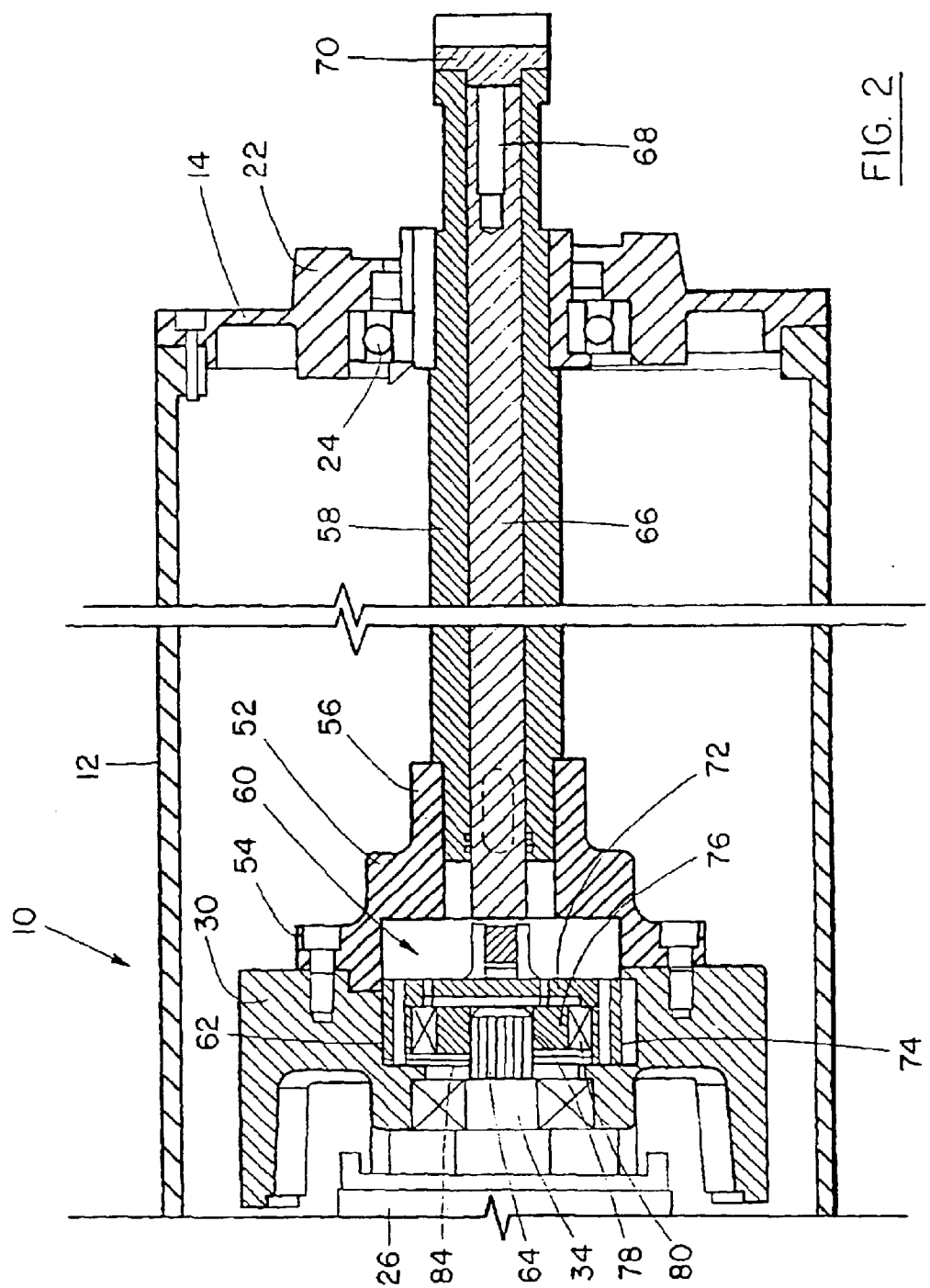
FIG. 2 is an enlarged sectional side elevation of a portion of the conveyor roller of FIG. 1 showing the releasable backstop in its engaged position.
Figure 3:
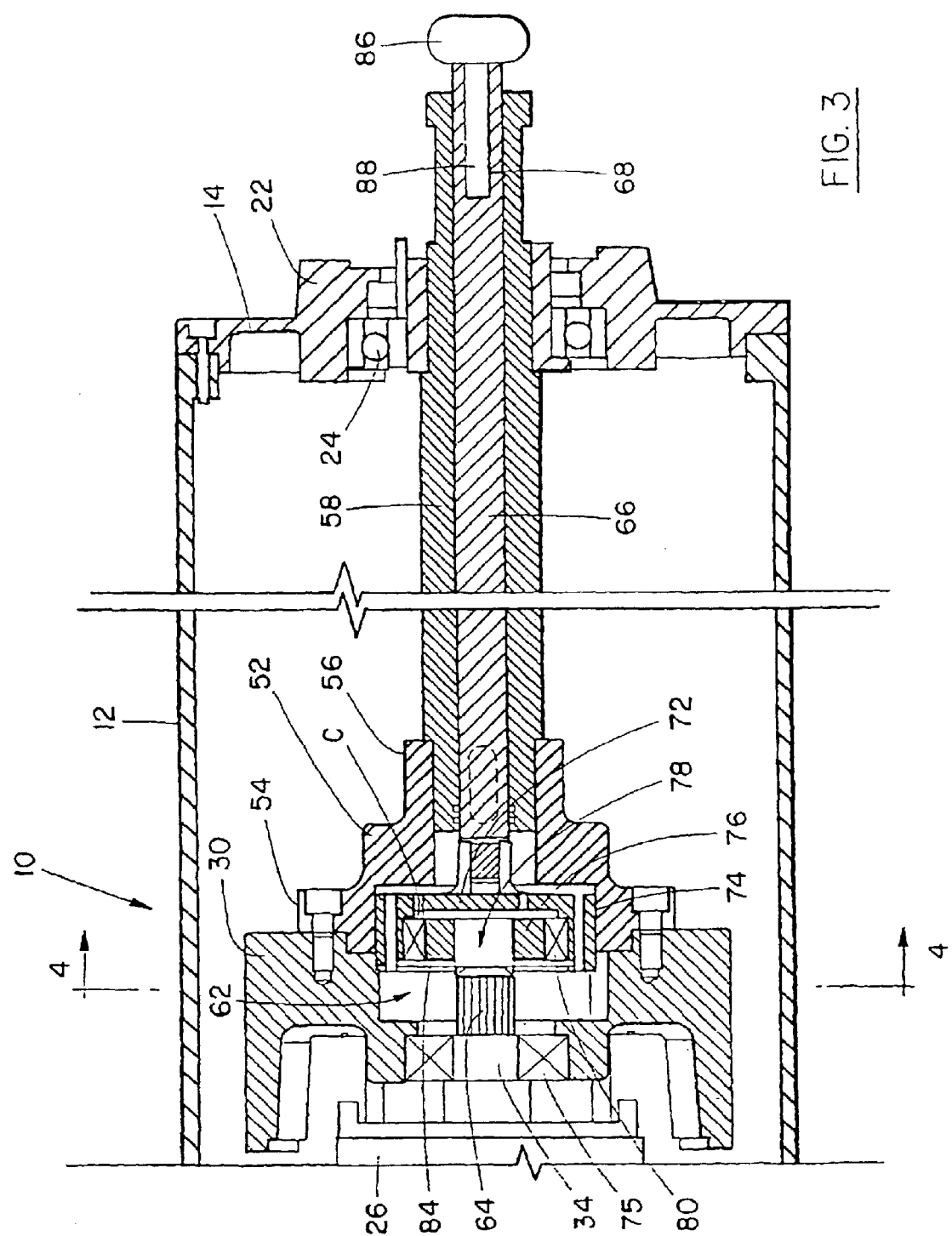
FIG. 3 is a sectional side elevation corresponding to FIG. 2 but showing the releasable backstop in its disengaged position, and, FIG. 4 is a section along line 4—4 of FIG. 3.
Figure 4:
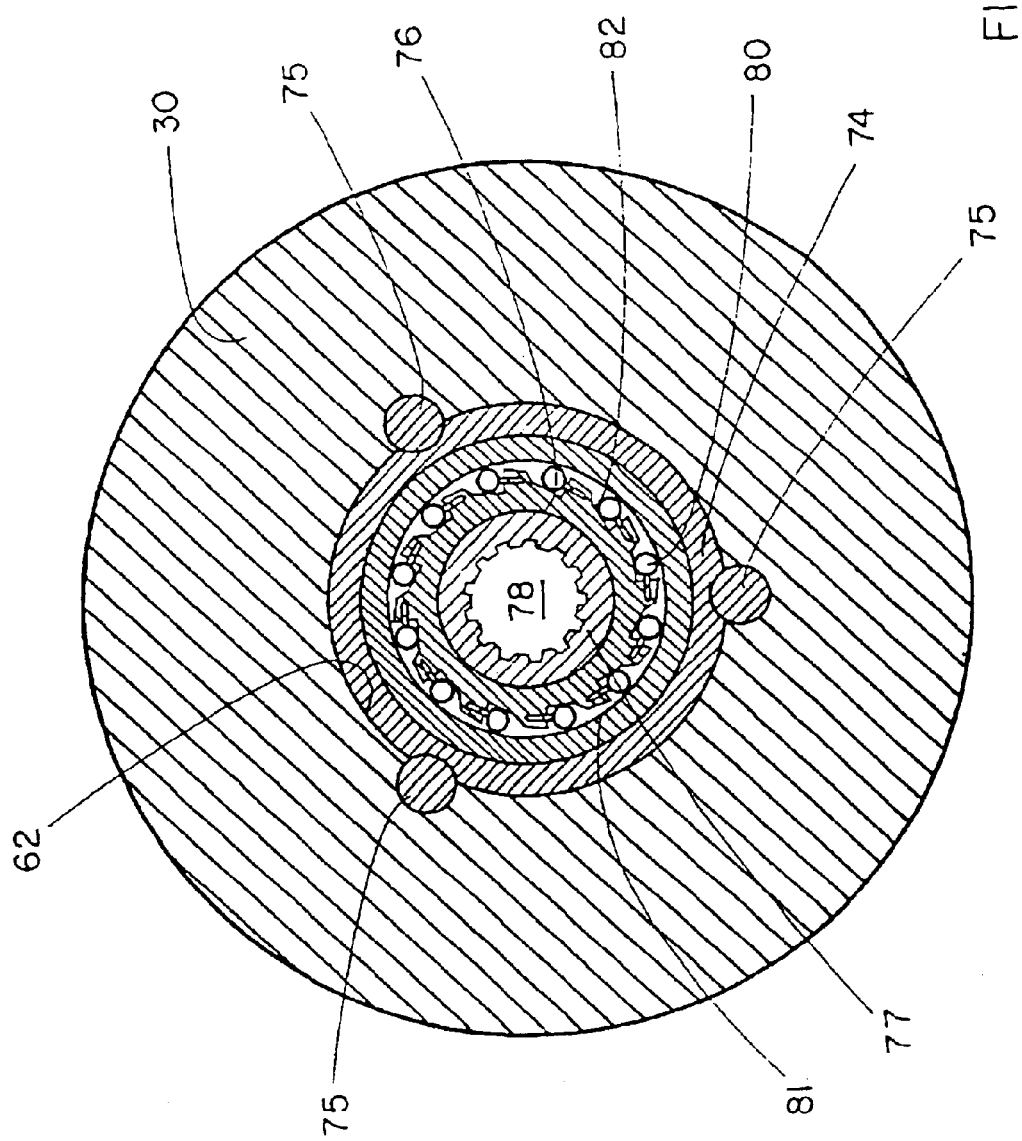

In order to permit manual disengagement, of body 76 from splined end of shaft 34, the rod 66, on which plate 72 is secured, is slidable within shaft 58, as can be seen by comparing FIG. 2 and FIG. 3.

In order to permit manual sliding of rod 66, the plug 70 is unthreaded and removed.

A handle member, or knob 86, having a threaded stem 88 is inserted in the threaded recess in the exposed end of shaft 58. By simply pulling on the knob 86 the rod is slid axially within shaft 58. This will draw plate 72, ring 74, and body 76 away from splined end 64 of shaft 34. The splined end 64 will then no longer be received in the splined recess 78 of drive body 77, and will not be subject to the one way reverse checking action of body 76, and rolls 80, described above.

In the event of the motor shutting down for any reason the motor shaft will now be free to rotate in the reverse direction, and thus permit the conveyor segment to move in reverse.

Clearly the body 76 can be re-engaged with splined end 64 by simply pushing the rod 66 inwardly.

By this means the conveyor roller is provided with a one way backstop which normally prevents reverse rotation of the roller, but which backstop can be disengaged whenever it is not required, thus providing the operator of the system with the flexibility of both modes of operation.

The foregoing is a description of a preferred embodiment of the invention which is given here by way of example only. The invention which is not to be taken as limited to any of the specific features as described, but comprehends all such variations thereof as come within the scope of the appended claims.

What is claimed is:

1. An adsorbent for cardiac glycoside contained in body fluid, comprising a compound which is immobilized on a water-insoluble carrier and has a log P value of at least 6,
    wherein P is a partition coefficient in an octanol-water system.

2. The absorbent of claim 1, wherein said water-insoluble carrier is a water-insoluble porous carrier.

3. The absorbent of claim 2, wherein said water-insoluble porous carrier has an exclusion limit for globular protein of at most 600,000.

4. The absorbent of claim 1, wherein the cardiac glycoside is digitalis.

5. A process for absorbing and removing cardiac glycoside contained in body fluid, which comprises contacting body fluid with an adsorbent for cardiac glycoside comprising a compound which is immobilized on a water-insoluble carrier and has a log O value of at least 6.

6. An absorber for cardiac glycoside which comprises a container having an inlet and an outlet for fluid and a means for preventing an adsorbent from flowing out of the container, wherein the adsorber is filled with the adsorbent for cardiac glycoside
    comprising a compound which is immobilized on a water-insoluble carrier and has a log P value of at least 6.

7. An internally powered conveyor roller as claimed in claim 6 and wherein said body member is formed with spaced apart roll recesses and rolls moveably located in respective recesses, and said rolls moving inwardly within said recesses upon rotation in one direction, and said rolls moving outwardly of said recesses upon reverse movement, thereby contacting and binding against said ring member and preventing further such reverse movement.

8. An internally powered conveyer roller as claimed in claim 7 and wherein said motor shaft is formed with a splined end portion and wherein said body member is formed with an internally splined recess for receiving said splined end, when in said engaged position.

9. An internally powered conveyer roller as claimed in claim 8 and wherein a support shaft is secured to said disc member closing said drum at one end thereof, and said shaft member defining a hollow interior and wherein said rod member is located within said hollow shaft member.

10. An internally powered conveyer roller as claimed in claim 9 and wherein said rod member is provided with means for grasping the outwardly extending portion of said rod member and manually drawing said rod member outwardly as aforesaid.

* * * * *

UNITED STATES PATENT AND TRADEMARK OFFICE
CERTIFICATE OF CORRECTION

| | |
|---|---|
| PATENT NO. | : 6,766,900 B2 |
| APPLICATION NO. | : 10/276393 |
| DATED | : July 27, 2004 |
| INVENTOR(S) | : Alexander D. Kanaris |

It is certified that error appears in the above-identified patent and that said Letters Patent is hereby corrected as shown below:

Col. 6, lines 19-42, delete Claims 1-6.

Replace these Claims with Claims number 1-6 on attached sheets.

1. An internally powered conveyor roller, of the type used for driving a conveyor medium in a first predetermined direction, and for preventing movement in a second direction opposite to the first and comprising;

roller means for carrying the conveyor medium;

internal drive means for driving the roller means;

one-way rotation means for permitting rotation of said roller means in one direction, and for preventing rotation in the opposite direction, and said one way rotation means being moveable between engaged and disengaged positions, and when in said disengaged position, being inoperative to prevent reverse rotation of said roller means.

2. An internally powered conveyor roller as claimed in claim 1 and wherein said roller means includes a cylindrical drum, and end discs closing each end of the drum, and motor means located within said drum.

3. An internally powered conveyor roller as claimed in claim 2 and wherein said end discs incorporate hubs and mounting shafts extending through said hubs for mounting said roller means in position in a conveyor system.

4. An internally powered conveyor roller as claimed in claim 3 and wherein said motor means drives said drum through reduction gear means within said drum.

UNITED STATES PATENT AND TRADEMARK OFFICE
CERTIFICATE OF CORRECTION

PATENT NO. : 6,766,900 B2
APPLICATION NO. : 10/276393
DATED : July 27, 2004
INVENTOR(S) : Alexander D. Kanaris It is certified that error appears in the above-identified patent and that said Letters Patent is hereby corrected as shown below:

5. An internally powered conveyor roller as claimed in claim 4 wherein said one-way rotation means includes a body member engageable with said motor drive means for controlling one way rotation thereof, and means for moving said body member into a disengaged position wherein said motor is free to rotate in either direction.

6. An internally powered conveyor roller as claimed in claim 5 wherein said body member is enclosed within a ring member and including rod means connected to said ring member and extending therefrom axially of said drum and through said disc member at one end of said drum, and means for operating said rod member to draw the same outwardly or to return it inwardly, thereby disengaging said body member from said motor shaft upon outward movement and re-engaging said body member with said motor shaft upon return movement of said rod member.

Signed and Sealed this

Nineteenth Day of September, 2006

JON W. DUDAS
*Director of the United States Patent and Trademark Office*